Dec. 28, 1965 W. J. HOGAN ET AL 3,225,795
MACHINE FOR FORMING AN EYE AT EITHER END OF
A WIRE BINDER ON WIREBOUND BOX COMPONENTS
Filed Aug. 16, 1963 6 Sheets-Sheet 4

INVENTOR.
William J. Hogan
BY Charles A. Endahl, Jr.
Curtis, Morris & Safford
ATTORNEYS.

United States Patent Office 3,225,795
Patented Dec. 28, 1965

3,225,795
MACHINE FOR FORMING AN EYE AT EITHER END OF A WIRE BINDER ON WIREBOUND BOX COMPONENTS
William J. Hogan and Charles A. Endahl, Jr., Dover, N.J., assignors to Stapling Machines Co., Rockaway, N.J., a corporation of Delaware
Filed Aug. 16, 1963, Ser. No. 302,582
10 Claims. (Cl. 140—104)

This invention relates to a machine for forming an eye at either end of a wire binder on wirebound box components. More particularly, the illustrative embodiment of the invention described herein is adapted for shaping eyes on the ends of intermediately positioned wire binders of box components, such as box blanks, end units, and lid units.

In the fabrication of wirebound boxes, there are many instances wherein it is desirable to utilize a wire binder extending across an intermediate region of the box component with the ends of this intermediate wire projecting out beyond the leading and trailing ends of the box component for making suitable connection with other parts of the box when the box is assembled. However, prior to this invention there have been difficulties in fastening the projecting ends of such intermediately positioned wire binders. The invention provides a machine for forming eyes quickly and dependably on the ends of intermediate wire binders on box components instead of feeding these box components through a conventional loop fastener machine, thereby obviating the necessity of utilizing the large and more complex loop fastener machine. Moreover, the eyes which are formed are advantageous in handling and bending wire ends as they are bent around other adjacent parts of the box blank to complete the assembly of the box.

It is among the many advantages of the present invention that it enables these projecting intermediate wire binders to be utilized safely and conveniently by shaping the projecting wire ends into an eye. This projecting wire with an eye at the end is adapted for engagement with adjacent parts of the box blank in assembling the boxes, and the eye provides a holding action while it protects people and objects from being injured by the projecting wire end during shipping, handling and emptying of the box.

In this specification and in the accompanying drawings are described and shown a machine for shaping an eye at either end of a wire binder projecting beyond the edges of a component of a wirebound box, and it is to be understood that this disclosure is for purposes of illustration in order that others skilled in the art may fully understand this invention and the manner of applying it in practical applications.

The various features, objects and advantages of the present invention will be described in further detail in conjunction with the accompanying drawings.

Figure 1:
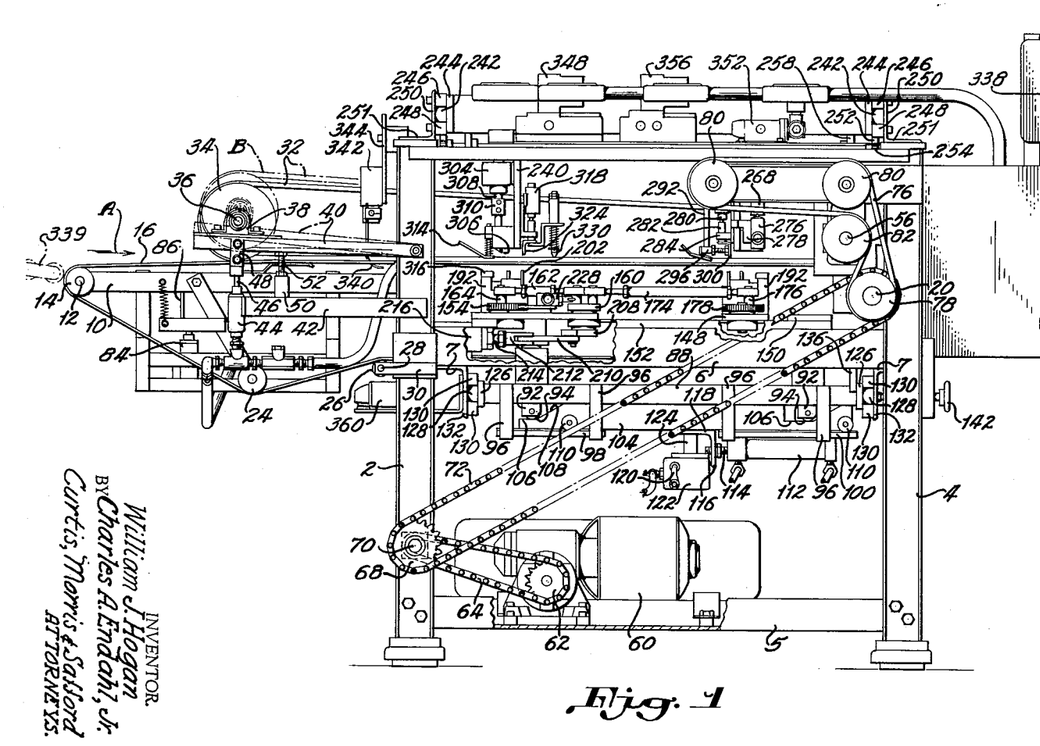
FIGURE 1 is a general elevational view of the left side of a machine for forming eyes on the projecting ends of an intermediate wire binder for a box component and shows the over-all arrangement and operation of the machine. A few parts of the machine have been illustrated as partially broken away to disclose the operating elements more clearly.
Figure 2:
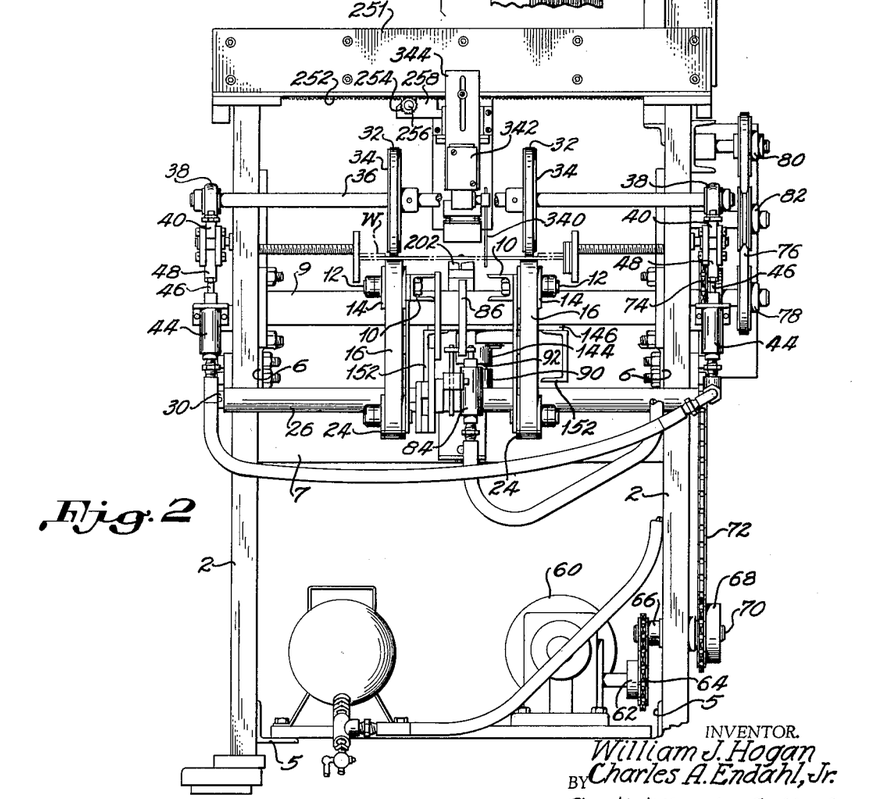
FIGURE 2 is a view of the front end of the machine as seen in elevation looking from the left of FIGURE 1.
Figures 3, 9, 10, 11:
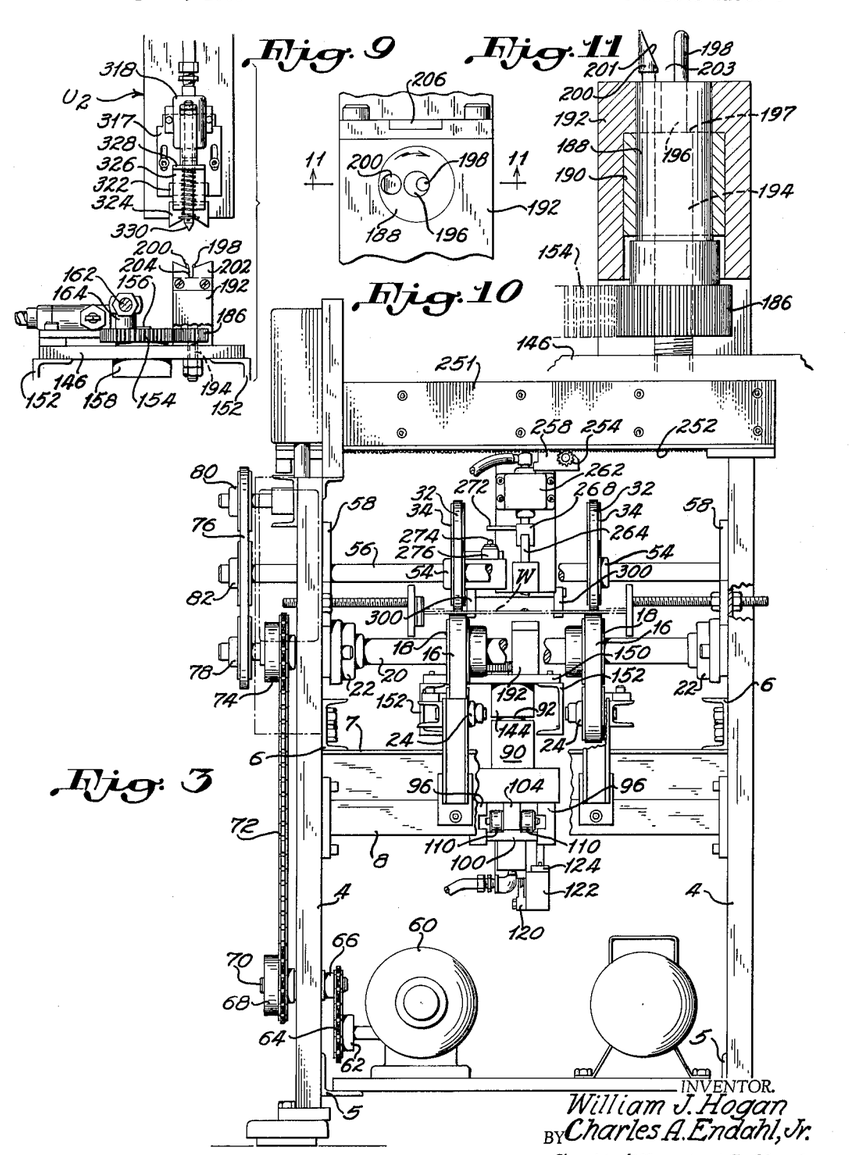
FIGURE 3 is a rear end elevation of the machine as viewed from the right of FIGURE 1.
FIGURE 9 is a partial elevational view taken along the line 9—9 of FIGURE 7 looking toward the left and showing apparatus which holds the box component fixed and severs the oppositely disposed end of the attached wire binder to proper length.
FIGURE 10 is an enlarged fragmentary top plan view of one of the wire-bending elements and its mounting.
FIGURE 11 is a sectional view taken on the line 11—11 of FIGURE 10 and shown on the same scale as FIGURE 10.

As shown in FIGURES 1, 2, and 3, the machine which is described herein as an illustrative embodiment of the present machine has a framework including a pair of corner posts 2 (FIGURE 2) at the front end of the machine and a pair of corner posts 4 (FIGURE 3) at the rear end of the machine. These corner posts are suitably braced by longitudinal frame members 5 and 6 and by lateral members 7, 8, and 9.

In order to feed and guide the box components, which comprise the work W, into the machine, there is an infeed framework attached to the front corner posts 2 and including a pair of parallel elongated channel members 10 (FIGURE 2). These channel members 10 support at their outer ends short studs 12 projecting outwardly and upon which are mounted freely rotating rollers 14. A pair of flat feed belts 16 pass around these rollers 14 so as to receive the incoming box components. These feed belts 16 travel through substantially the full length of the machine, being adjustably spaced apart and trained about larger diameter rollers 18 keyed to a drive shaft 20 (FIGURE 3) at the rear or output end of the machine. This drive shaft 20 is journaled in bearings 22 fastened to the inner face of the corner posts 4. The feed belts 16 also pass beneath idler rollers 24 (FIGURE 1) with their lower run passing over an elongated roller 26 which is rotatably mounted on a small diameter shaft 28 with its ends fixed in brackets 30 attached to the outer face of the front corner posts 2.

These flat feed belts 16 as shown herein are of the type which are known commercially as "timing belts," having crosswise ribs suitably spaced apart to register with and be received in cooperating notches in the working face of the rollers about which the belts 16 are trained, so as to provide positive forward movement in carrying the box components into the machine in the direction indicated by arrow A in FIGURE 1.

Figure 13:
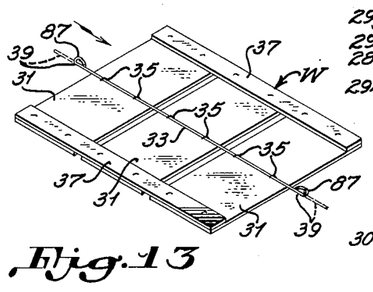
FIGURE 13 is a perspective view of an end unit of a wirebound box showing its attached intermediate wire binder provided with an eye-like loop at either end.

The machine as illustrated herein is adapted to be set up for handling various box components, such as box blanks and end units, as may be desired from time to time. In this particular example the machine is shown as being set up for handling end units (FIGURE 13) which are often referred to herein as the work W being handled by this machine. As shown in FIGURE 13, these end units W include one or more wide slats 31 with an intermediately positioned wire binder 33 extending across these slats and being suitably secured to them, for example, by staples 35 driven astride of the wire binder 33. The slats 31 are fastened together at their ends by cleats 37, and the ends 39 of the wire binder 33 project out beyond the leading and trailing ends of the end unit W. In the fabrication of a box component W having such an intermediately positioned wire binder 33 this wire may be provided by supply apparatus of the type disclosed in patent application Serial No. 192,889, filed May 7, 1962, now Patent No. 3,123,830.

To assure positive gripping and feed movement of the work W to its desired position within the machine to be operated upon by the wire-severing and eye-forming mechanisms, there are provided a pair of presser belts 32, which are shown as V-belts and which are adjustably spaced apart. During operation these presser belts 32 are normally adjusted so as to be positioned substantially atop and in alignment with the respective flat feed belts 16. These presser belts 32 travel along substantially the full length of the machine, and at the front end of the machine they are trained about V-grooved pulleys 34 which are adjustably fixed to a shaft 36. This shaft 36 is journaled in bearings 38 mounted atop and adjacent to the outer ends of a pair of parallel arms 40 which can be swung upwardly slightly as indicated in FIGURE 1 by the outline shown in dashed lines. The inner ends of these movable arms 40 are pivotally secured to the outer face of the corner posts 2 (FIGURES 1 and 2).

For receiving the incoming work W between the feed belts 16 and the presser belts 32, the arms 40 and pulleys 34 and associated mechanism are caused to be moved upwardly at predetermined intervals as shown by the broken lines B. To accomplish this upward movement, there are a pair of rigid support arms 42 secured to the outer face of the corner post 2 for supporting suitable lift means, for example such as air cylinders 44 with piston rods 46 carrying a clevis 48 pivotally secured to the arms 40. Conveniently positioned on the top face of the fixed support arms 42 is a boss 50 having an adjustable stop screw 52 threaded therein. When these stop screws 52 are properly adjusted they normally hold the movable arms 40 at such a height as to provide a bite relationship between the feed belts 16 and the presser belts 32 in receiving and advancing the work W into the machine.

The presser belts 32 extend into the machine for approximately the full length of the upper run of the feed belts 16. Near the output end of the machine these presser belts pass around smaller diameter pulleys 54 (FIGURE 3) adjustably fixed to a drive shaft 56 rotatably mounted in plate members 58 integrally secured to the inner face of the corner posts 4.

A main driving mechanism to impart clockwise rotation to the drive shaft 20 for advancing the feed belts 16 in the direction indicated by arrow A is provided by a motor 60, drive sprocket 62, roller chain 64, sprocket 66 and sprocket 68, both keyed to a short shaft 70, roller chain 72, and a sprocket 74 which is secured to the drive shaft 20. This main drive mechanism also imparts counterclockwise rotation to the drive shaft 56 for moving the lower run of the presser belts 32 in the forward direction A. For transmitting this rotation to the shaft 56 a V-belt 76 engages a pulley wheel 78 secured to the outer end of the drive shaft 20. This drive belt 76 passes over a pair of idler pulleys 80 and drives a pulley wheel 82 keyed to the outer end of the shaft 56.

In order to stop and then release the units of work W at the desired intervals just prior to entering into the feeding bite between the belts 16 and 32, controllable release means are provided in the form of an air clamp 84 for actuating an upstanding control finger 86 which is lowered automatically at predetermined intervals to release the units of work W.

The wire-severing and eye-forming mechanisms which operate upon the projecting ends 39 of the wire 33 stapled to the work W for forming the eyes 87 will be described with particular reference to FIGURES 4, 5, 6 and 7. In the lower portion of FIGURES 4 and 7 there is shown a laterally adjustable assembly comprised of an inverted channel chassis member 88 having an opening in its top surface adjacent to either end. Integrally secured in register with these openings are guide sleeves 90 within which are slidably housed short lift rods 92. The upward and downward movement of these lift rods 92 is controlled by freely rotating rollers 94 mounted in the lower ends of the rods 92 as will be explained. Integrally fastened to either side of the chassis member 88 near the sleeves 90 are pairs of downwardly projecting hanger brackets 96 for supporting respective rail plates 98 and 100. These rail plates 98 and 100 each bear a hardened raised track portion 102 of narrow width extending the full length of the rail plates. A movable elevator control bar 104 slidably rests upon the raised tracks 102 and has a width corresponding to that of the tracks, as seen in FIGURE 3. This elevator control bar 104 includes a cutaway horizontal step 106 with an upwardly inclined cam surface 108 shaped therein adjacent to either end, and the elevator bar has rollers 110 mounted thereon straddling the tracks 102 and rolling upon the respective rail plates 98 and 100. Thus, the elevator bar 104 is maintained in proper alignment with the tracks 102 when it is moved longitudinally as indicated by the arrow C, as will be described further below.

The purpose of this elevator control bar 104 as will be explained in detail further below is to elevate a work table which carries the eye-forming mechanism and also carries wire-severing dies and aligning guides for assuring that the wire ends 39 (FIGURE 13) are suitably positioned with respect to the wire-severing dies. In operation the work table is elevated by movement of the elevator bar 104 in the direction C, and then this work table is lowered back down to its original position when the elevator bar 104 returns to its initial position. The work table is only raised for a brief period at the moment when each unit of work W (as indicated in FIGURE 7) has been correctly positioned and centered with respect to the wire-forming and severing stations of the machine.

For operating this elevator control bar 104, work-table-elevating drive means are provided comprising an air cylinder 112 attached to the bottom of the rail plate 100 and including a piston rod 114 adjustably attached to a depending leg 116 of a bracket 118 fastened to the bottom face of the elevator bar 104. When the elevator bar 104 has been moved in the direction C so as to raise the work table fully up to its operating position, then this leg 116 actuates a switch arm 120 of an electric switch 122 which is attached to an inverted T-shaped bracket 124 fastened to the inner face of the chasis member 88. This switch 122 initiates the operation of the upper wire-severing and work-holding units $U_1$ and $U_2$ (FIGURE 7) which cooperate with the various elements of the elevated work table, as will be explained in detail, for severing the wire ends and forming the eyes 87 (FIGURE 13) thereon.

To enable the chassis member 88 to be adjusted laterally for setting the work table to the desired lateral position, the chassis member 88 has a roller support member 126 secured to either end with a pair of spaced rollers 128 mounted thereon. These rollers 128 run between a pair of rails 130 fastened to the inner face of a vertically positioned leg 132 of the main lateral frame braces 7 at the front and rear ends of the machine. This lateral adjustment of the chassis member 88 provides for lateral adjustment of the wire-end-shaping and severing mechanisms as may be desired for adjusting the machine for handling different types of box components W from time to time, but during operation this chassis member 88 is held stationary at its adjusted position.

Figure 7:
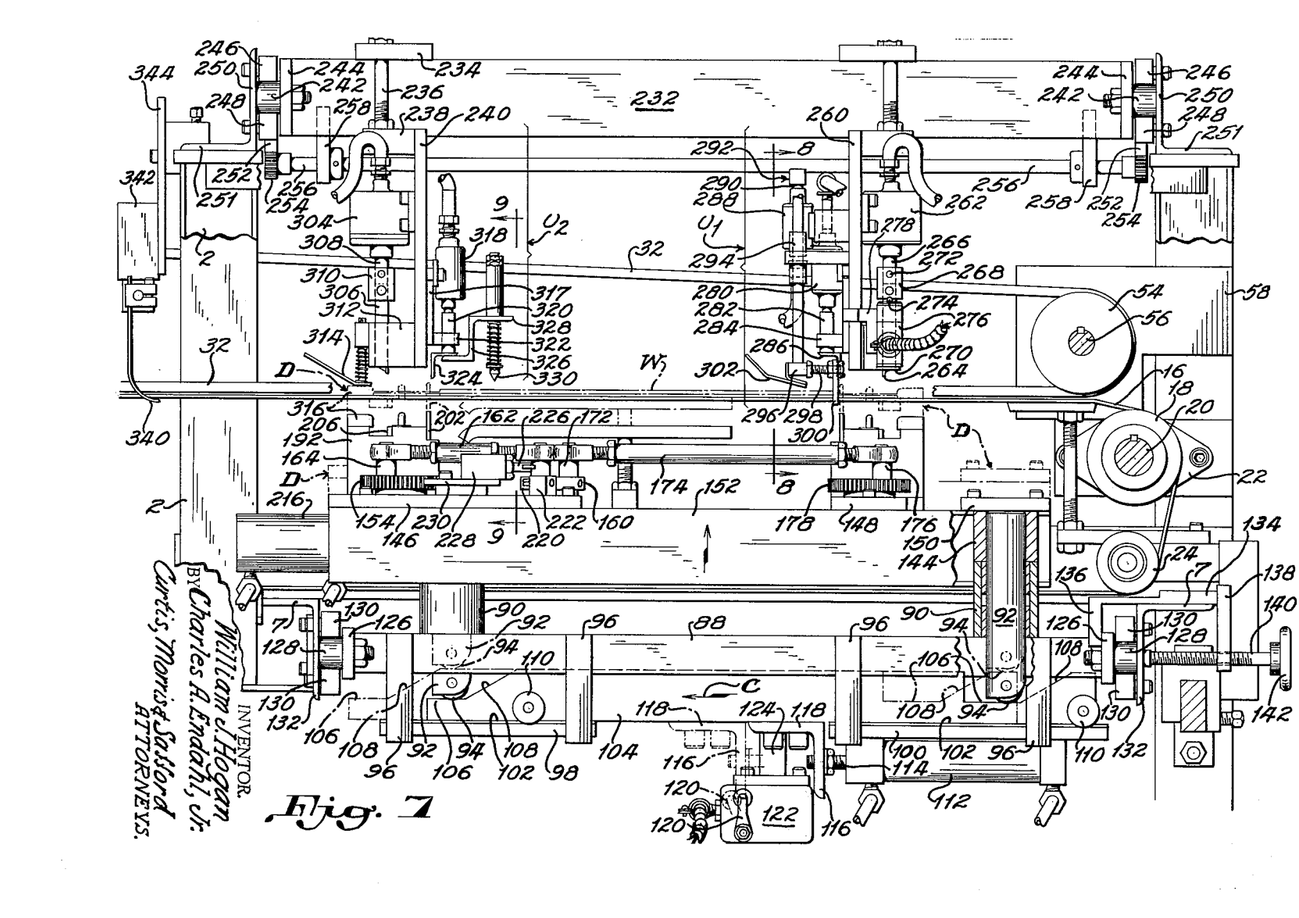
FIGURE 7 includes the eye-forming mechanism as shown in FIGURE 4 and additionally shows parts of the machine which cooperate therewith for positioning the box component and for severing the projecting ends of the attached wire binder to a desired length prior to forming eyes thereon.

For maintaining the desired laterally adjusted position of the chassis member 88, there is a suitable clamping arrangement, as is best shown in FIGURE 7 near the lower right corner thereof. This clamping arrangement includes an inverted U member 134 with an inner leg 136 which is hooked about the roller support member 126 and with an outer leg 138 bearing a clamp screw 140. The clamp screw 140 seats against the outer face of the vertical leg 132 of the lateral brace member 7 and is operated by a hand wheel 142 for locking the chassis member 88 in place.

Figure 4:
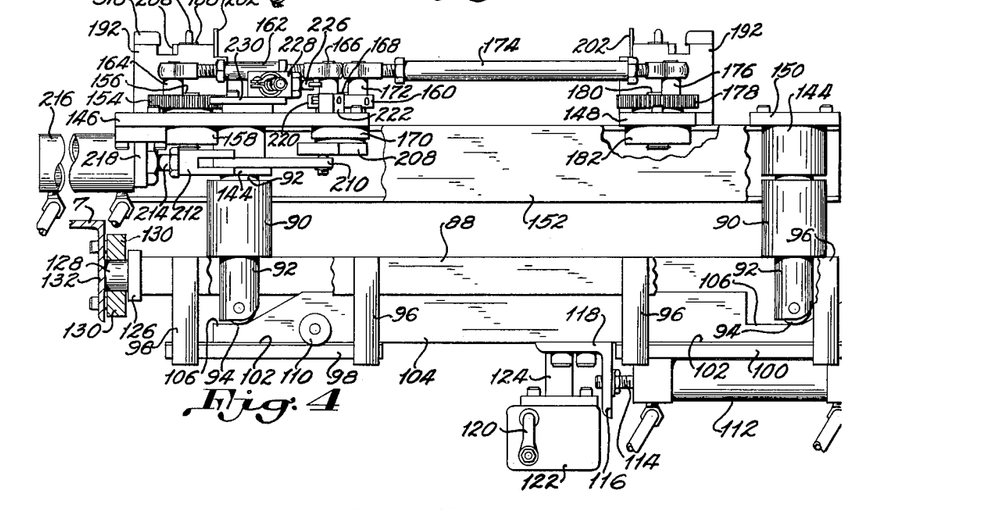
FIGURE 4 shows the central area of FIGURE 1 on a larger scale and includes the mechanism which forms an eye on the projecting ends of an intermediate wire binder attached to a component of a wirebound box.
Figure 5:
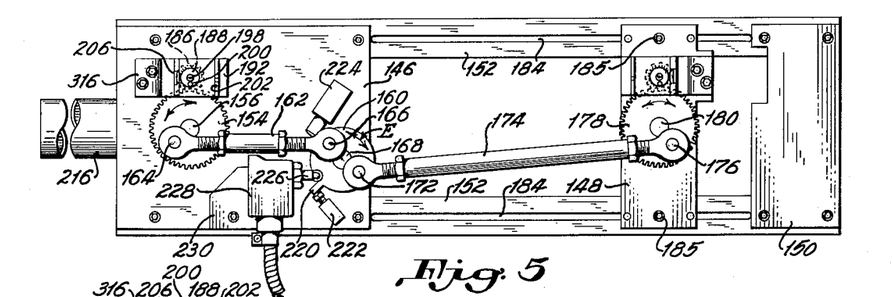
FIGURE 5 is a top plan view of the mechanism shown in FIGURE 4 and drawn on the same scale as in FIGURE 4.
Figure 6:
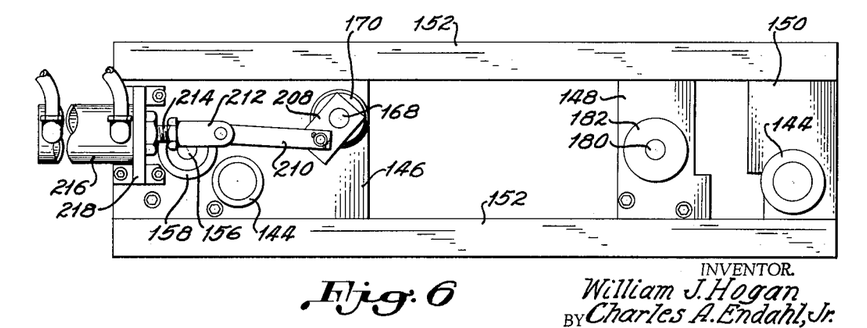
FIGURE 6 is a bottom plan view of this same mechanism on the same scale as in FIGURE 4 and showing means for operating the wire-bending elements.

The mechanism for forming an eye 87 (FIGURE 13) at either end of the intermediate wire binding 33 is shown in detail in FIGURES 4, 5, and 6. This eye-forming mechanism is supported on work table means comprised of a pair of parallel channel members 152 with flanges facing inwardly and three table plate elements 146, 148 and 150, extending between the respective upper flanges of these channel members 152. As shown in FIGURES 4 and 5, one of the eye-forming mechanisms includes a gear 154 fixed to the upper end of a short vertical shaft 156 which is rotatably mounted in the table plate 146 and extends down through a boss 158 on the bottom of the plate 146. This shaft 156 is turned back and forth by means of an angularly reciprocating rocking drive member 160 which acts through a connecting rod 162 of adjustable length. One end of the connecting rod 162 is pivotally mounted on an upstanding stud 164 fixed to the gear 154, and the other end is pivotally mounted on a stud 166 fixed to the rocking drive member 160. This rocking drive member is secured to the upper end of short vertical shaft 168 rotataby mounted in the table plate 146 and extending down through a boss 170. For purposes of driving the other eye-forming mechanism, the rocking drive member 160 bears another short stud 172 located a desired distance from the stud 166 and on which is pivotally mounted one end of a second connecting rod 174 of adjustable length. The other end of this connecting rod 174 is pivotally mounted on a short stud 176 fixed to a gear 178 which is fastened to the upper end of a short vertical shaft 180 rotatably mounted in the table plate 148 and extending down into the boss 182.

In order to provide adjustment for accommodating wire binders 33 of different lengths, the table plate 148 with associated eye-forming and wire-severing apparatus mounted thereon is adjustable in position along the work table means 152 as allowed by elongated slots 184 (FIGURE 5) in the upper flanges and by releasable clamp screws 185 engaging therein.

The two gears 154 and 178 of the respective eye-forming drive apparatus are of similar proportions and cooperate with other elements of the machine in a similar manner. Therefore, the operation of both eye-forming mechanisms will be understood from a description of the action of the gear 154 in cooperation with its associated elements. This gear 154, as shown in FIGURE 5 and as partially shown by dot-dash lines in FIGURE 11, meshes with a gear 186 of a smaller diameter which is affixed to the bottom end of a sleeve 188 rotatably mounted in a bushing 190 carried by a housing 192.

The sleeve 188 is bored and rotatably fits about a stationary upstanding anvil element 194 threaded into the table plate 148. The upper end of this anvil element 194 has a reduced neck portion 196, and a corresponding reduced diameter shoulder 197 at the upper end of the bore of the sleeve 188 provides means for suspendedly supporting this sleeve 188 on the shoulder of the anvil element 194. As shown in FIGURES 10 and 11, the neck portion 196 of the anvil element 194 is still further reduced to provide a fixed eye-forming post 198 of relatively small diameter eccentrically located thereon and projecting upwardly a desired distance above the upper surfaces of housing 192 and sleeve 188.

To cooperate with the fixed eye-forming post 198 for shaping the wire end 39 into an eye 87 the rotatably mounted sleeve 188 supports an eccentrically positioned forming tool 200 whose inner face 201 is suitably beveled to facilitate entry of the wire end 39 into the space 203 between itself and the fixed post 198. For assuring proper entry and alignment of the wire end 39 into the space 203 there is a vertically positioned converging guide 202 (FIGURES 9 and 4) of thin cross section attached to a step portion adjacent to the top surface of the housing 192. The upper edge of the guide 202 has a shallow V notch to direct the wire end 39 into a central recess 204. This alignment of the wire end 39 is obtained through the cooperation of another similar upper converging guide 324 (FIGURE 9) which is included in the upper unit $U_1$ and which will be described later in conjunction with a movable cutter element which co-acts with a stationary cutter 206 (FIGURE 4) assembled on another step portion on the upper surface of the housing 192 on the opposite side thereof from the location of the converging guide 202.

In order to form the eyes 87, an arcuate rocking movement is imparted to the drive member 160 by eye-shaping drive means comprising a short lever 208 (FIGURE 6) fixed to the lower end of the shaft 168 and a connecting rod 210 which is pivotally fastened to a clevis 212 adjustably mounted on the end of the piston rod 214 of an air cylinder 216. This eye-shaping drive cylinder 216 is secured to a bracket 218 fastened to the under face of the plate member 146. As shown in FIGURE 5, the rocking drive member 160 is provided with an outwardly projecting finger 220 of sufficient length to engage the stop members 222 and 224, thus determining the extent of arcuate movement of the drive member 160. During the conclusion of this eye-shaping movement the stud 172 actuates a contact plunger 226 of an electric switch 228 which is conveniently mounted on a bracket 230 fastened onto the plate member 146.

The purpose of the switch 228 is to produce actions such that all of the operating parts return to their initial positions, and hence this switch 228 is referred to as the end-of-cycle switch.

Figure 8:
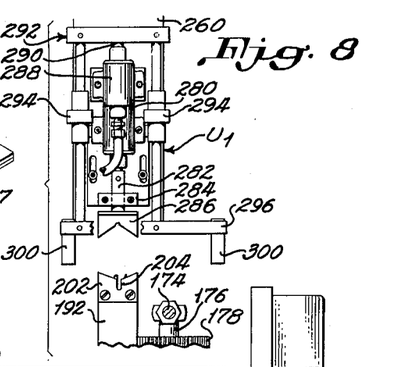
FIGURE 8 is a partial elevational view taken along the line 8—8 of FIGURE 7 looking toward the right and showing apparatus which positions the box component and severs one end of its attached wire binder to proper length.

As most clearly shown in FIGURES 7, 8, and 9, there are two separate upper units $U_1$ (FIGURE 8) and $U_2$ (FIGURE 9) which cooperate with the eye-forming mechanism just described above. The unit $U_1$ positions the work and severs the leading end of the wire binder 33 to proper length, and the unit $U_2$ holds the work fixed in position and severs the trailing end of the wire binder to proper length. The unit $U_2$ is adjacent to the input end of the machine proper and at a desired height above the eye-forming mechanism which operates upon the wire end 39 at the trailing edge of the work W and is adjustably fixed to a longitudinal chassis member 232 by means of a support clamp 234 having bolts 236 threaded into a slotted flange 238 of a mounting body 240. The other unit $U_1$ is of similar construction and is held suspended in the same manner as the unit $U_2$ above the eye-forming mechanism which operates upon the wire end 39 at the leading edge of the work W (FIGURE 7). A lateral adjustment of the chassis member 232 with its attached units $U_1$ and $U_2$ is provided by a pair of spaced rollers 242 carried by flanges 244 at either end of the chassis member 232. These rollers 242 can travel between a pair of rails 246 and 248 fastened to the inner face of a vertical flange 250 of a lateral brace 251 at the top of the front and rear ends of the machine. The lateral movement of the chassis member 232 is controlled by means of racks 252 (FIGURES 2 and 3) fastened to the bottom face of the lower rail 248 and by spur gears 254 meshed therewith and fixed to the ends of a long shaft 256 rotatably mounted in brackets 258 secured to the chassis member 232.

As shown in FIGURES 1, 7 and 8, the unit $U_1$ includes a mounting body 260 carrying cutting means including an air clamp 262 with a movable cutter 264 fastened to its operating shaft 266 by a coupling 268. This cutter 264 is guided during its vertical reciprocation by a cutter-guide block 270 secured to the lower portion of the mounting body 260. An upper holding pin 272 of the coupling 268 projects outwardly from its nearer side (FIGURE 7) a suitable distance (FIGURE 3) so that during the downward motion occurring at the conclusion of the wire-severing operation this pin 272 engages and depresses a plunger 274 of an electric switch 276 mounted on a bracket 278 fastened to the face of the mounting body 260. The purpose of this switch 276 is to initiate the operation of the eye-shaping drive means 216, as will be explained in detail further below.

On the opposite side of the mounting body 260 from the location of the wire-severing drive means 262 are fastened a pair of air cylinders 280 and 288. The air cylinder 280 is positioned adjacent to the face of the mounting body 260 and has an extension rod 282 secured to its operating shaft. This extension rod 282 is guided during its vertical reciprocation by a guide block 284 attached to the lower portion of the mounting body 260.

In order to direct the wire end into the lower converging guide 202 secured to the housing 192, there is an upper converging guide 286 secured to the extension rod 282. The lower edge of this upper guide 286 has an inverted V-shape (FIGURE 8) which cooperates in its downward movement with the shallow V-shape of the lower guide 202 on the eye-forming housing 192, thereby properly aligning and centering the wire end 39 in the recess 204 prior to the severing operation.

The other air cylinder 288 is spaced outwardly a suitable distance from and is attached to the same face of the mounting body 260 as the air cylinder 280. This air cylinder 288 includes an operating shaft 290 projecting upwardly therefrom which supports a yoke 292 (FIGURE 8). The yoke 292 is guided during its vertical reciprocation by guide members 294 secured to and projecting outwardly from the mounting body 260. A tie bar 296 at the base of the yoke 292 supports a pair of adjustable brackets 298 near its opposite ends, and these brackets 298 carry downwardly projecting locating fingers 300 which serve as a temporary stop barrier to position longitudinally a unit of incoming work W in proper position between the wire-cutting and eye-forming stations at the leading and trailing edges of the work. Attached to the outer face of the tie bar 296 at a convenient location is a resilient holding member 302 which is brought to rest upon the wire 33 in a region overlying the work W prior to and during the cutoff operation performed by the cutter 264.

As shown in FIGURES 1 and 7, the mounting body 240 of the unit $U_2$ carries means for severing the trailing wire end comprising an air clamp cylinder 304 with a movable cutter 306 fastened to its operating shaft 308 by a coupling 310. This cutter 306 is guided during its vertical reciprocation by a guide block 312 attached to the lower end of the mounting body 240.

In order to press the loose end 39 of the wire 33 against a back-up block 316 (see also FIGURE 5) which is fastened to the upper face of the housing 192 for holding this end during the wire cutoff operation performed by the coaction of the upper cutter 306 and lower cutter 206, there is a resilient holding element 314 mounted upon the forward face of the cutter guide block 312. An adjustable plate 317 is attached to the opposite face of the mounting body 240 (FIGURE 9) and carries an air cylinder 318 having an extension rod 320 secured to the end of its operating shaft. The rod 320 is guided during vertical reciprocation by a guide block 322 at the lower end of the adjustable plate 317. Advantageously, the actuation of the air cylinder 318 effects two operations simultaneously, namely, guiding the trailing wire end 39 into the recess 204 and clamping the work W firmly in a predetermined position. A converging guide 324 (FIGURE 9) is driven by the extension rod 320, and this guide 324 has an inverted V shape (FIGURE 9) to cooperate with the shallow V shape of the lower guide 202 in aligning the trailing wire end 39 prior to the severing operation. A Z-shaped bracket 326 (FIGURE 7) is attached to the upper guide 324 and supports on its upper end 328 a spring-biased pointed holding pin 330 which engages the work W so as to hold it in fixed position prior to and during the wire-severing and eye-forming operations.

Figure 12:
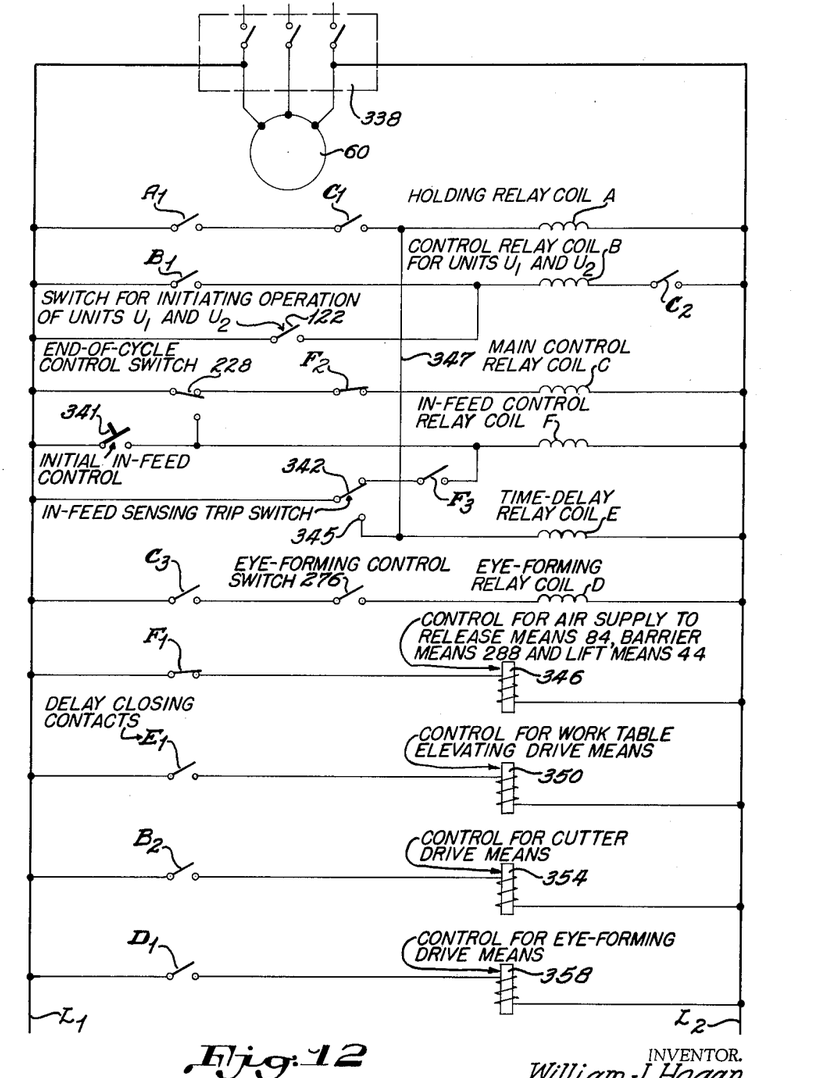
FIGURE 12 is a schematic diagram of the electrical control circuit.

The operation of the machine will be reviewed in detail with particular reference being directed to the schematic wiring diagram of FIGURE 12. Upon the closure of a main witch 338 (FIGURE 1) the motor 60 is energized so as to impart forward movement to the feed belt 16 and to the presser belt 32. Also, closure of the main switch 338 serves to energize a pair of electrical lines $L_1$ and $L_2$. Thus, a main control relay coil C is energized which causes its electrical contacts $C_1$, $C_2$, and $C_3$ to close. The circuit for energizing this main control relay coil C extends between the lines $L_1$ and $L_2$ and includes the normally closed end-of-cycle switch 228 and the contacts $F_2$ which are normally closed.

During operation the units of work W are fed continuously by conveyor means 339 (FIGURE 1) on to the flat feed belts 16 which carry them into the bite between belts 16 and 32. In order to allow the first unit of work to enter the machine, it is necessary to retract the work-arresting and release means 84, 86. Thus the operator presses an initial in-feed switch 341 (normally open) so as to close this switch 341 momentarily. Accordingly, an in-feed relay coil F is energized and actuates its three sets of relay contacts $F_1$, $F_2$ and $F_3$. The set of relay contacts $F_1$ and $F_2$ are normally closed, as shown in FIGURE 12, while the contacts $F_3$ are normally open.

Upon the energization of the in-feed relay coil F, as mentioned above its normally closed contacts $F_1$ and $F_2$ become opened while its contacts $F_3$ become closed. Closure of contacts $F_3$ serve to maintain the energization of the coil F after the initial in-feed switch 341 has been released by the operator, and opening of the contacts $F_1$ serves to de-energize a solenoid 346. This solenoid 346 controls the operation of the work-arresting and release means 84, 86 and also controls the operation of the temporary stop barrier positioning means 288, 300.

When solenoid 346 is de-energized it closes an air supply valve 348 (top of FIGURE 1) and allows air to escape from the work-arresting and release cylinder 84 permitting its operating shaft to retract downwardly, thus removing the escapement finger 86 from the path of the initial unit of work W which would otherwise be held stationary by this finger 86. Occurring simultaneously with this action, the air valve 348 supplies a flow of air to the temporary stop barrier operating cylinder 288, thus raising its operating shaft 290 with attached yoke 292 to its upper position. Consequently, the temporary barrier fingers 300 are raised, and this would ordinary release a completed unit of work W from the machine.

However, in this instance the machine is in its initial empty condition.

As the initial unit of work W moves forward its leading edge hits against a trip finger 340 (FIGURE 7) of an electric in-feed sensing trip switch 342 mounted on a bracket 344 carried by the angle brace 251 extending across between the top of the corner posts 2 at the front of the machine. When this switch 342 is momentarily actuated by the incoming work unit W it engages a contact 345 and thus energizes a holding coil A through a lead 347, and coil A closes its holding contacts $A_1$ which serve to by-pass the circuit through the switch terminal 345. Also, actuation of the switch 342 into engagement with the contact 345 energizes the coil E of a time-delay relay and at the same time the delay contacts $E_1$ begin to close in a delayed manner. Also, the holding contacts $A_1$ maintain the coil E energized after the infeed trip switch 342 returns to its initial position as shown in FIGURE 12.

In addition, when the in-feed trip switch 342 is momentarily actuated by the incoming unit of work W, it opens the in-feed coil F holding circuit which was being maintained through the contacts $F_3$. Consequently, the coil F is deenergized, so that the normally closed contacts $F_1$ and $F_2$ become re-closed.

When the normally closed contacts $F_2$ become re-closed, the main control relay coil C is energized through the contacts $F_2$. Thus, the contacts $C_1$ are closed to enable the holding circuit for the time-delay relay coil E to be effective. This holding circuit can be traced from $L_1$ through contacts $A_1$ and $C_1$ and through the lead 347 to the coil E and thence to $L_2$.

When the normally cosed contacts $F_1$ become re-closed, the solenoid 346 is re-energized and it opens an air valve 348 (top of FIGURE 1) allowing air to flow to the work-arresting and release cylinder 84 causing its operating shaft to move upwardly, thus placing the escapement finger 86 into the path of the next following unit of work W which will thus be held stationary by this finger 86 while the initial unit of work W is being operated upon. Occurring simultaneously with this action, the air valve 348 shuts off the flow of air to the temporary stop barrier operating cylinder 228, which normally holds its operating shaft 290 with attached yoke 292 in its upper position, thus, the temporary barrier fingers 300 are released and drop to their lower effective position as shown in FIGURES 7 and 8, in which the fingers 300 extend down into the path of the oncoming unit of work W. Consequently, this unit of work is stopped in proper position to have its wire ends 39 operated upon.

Also, occurring instantaneously with the arresting of the succeeding unit of work W by the escapement finger 86, air is permitted to flow to air valve lift means 44 causing their operating shafts 46 and attached arms 40 and associated mechanism to move upwardly, thereby opening the feeding bite between belts 16 and 32 by raising the presser belts 32 up to position B where they are removed from feeding contact with the unit of work which is being held by the work-arresting means 84, 86.

By this time the delay period has passed, thus enabling the incoming unit of work W to have time to reach the operating stations of the machine wherein its leading edge bears against the lowered stop barrier 300. The time delay contacts $E_1$ now become closed, and hence a solenoid 350 of an air valve 352 (top of FIGURE 1) is energized permitting air to flow to the work-table elevating drive means cylinder 112, causing its operating shaft 114, and elevator control bar 104 to move in the direction indicated by arrow C. Thus, the rollers 94 are cammed upwardly by the inclined surfaces 108, and the lift rods 92 elevate the work table comprising channel members 152 and table plates 146, 148, and 150. Consequently, the mechanism mounted thereon is raised upwardly to its operating position D (FIGURE 7) adjacent to the underside of units $U_1$ and $U_2$, as indicated by the dot-dash lines. When this work table reaches its operating level, the vertical leg 116 (FIGURE 7) of the bracket 118 actuates the arm 120 to close the electric switch 122 for initiating operation of the units $U_1$ and $U_2$.

Thus, the coil B is energized, closing contacts $B_1$ and $B_2$ to energize solenoid 354 of air valve 356 (top of FIGURE 1) allowing air to flow to the cutter drive means 262 of the unit $U_1$ and to the cutter drive means 304 of the unit $U_2$ thus driving their respective movable cutters 264 and 306 downwardly to sever the wire ends 39 to the desired length.

At the end of this wire-cutting operation, the holding pin 272 (FIGURE 3) of the coupling 268 depresses the plunger 274 so as to actuate the eye-shaping control switch 276 to close its contacts. Closure of the eye-shaping control switch 276 energizes a coil D, thus closing contacts $D_1$ and thereby energizing a solenoid 358 of an air valve 360, thus allowing air to flow to eye-shaping drive means cylinder 216. The operating shaft 214 move outwardly, thereby imparting an arcuate movement indicated by arrow E (FIGURE 5) to the drive member 160, first in a clockwise direction to produce the desired action of its associated mechanism to rotate the sleeve 188 in a clockwise direction so that its wire-forming tool 200 urges the wire end 39 about the anvil post 198 to form an eye 87 thereon at the trailing edge of the unit of work W. Similar mechanism operates on the wire end 39 at the leading edge of said work and bends the eye in the opposite direction. Thus, the respective eyes 87 are formed against the same side of the respective wire ends 39 (FIGURE 13).

As the drive member 160 approaches the end of its clockwise rotation, its short stud 172 depresses the plunger 226 of the end-of-cycle switch 228, opening its contacts with the result that main control coil C is de-energized, and thus the respective sets of contacts $C_1$, $C_2$, and $C_3$ are opened. Consequently, the holding coil A is de-energized so that the holding contacts $A_1$ open, and the coil B is de-energized so that contacts $B_1$ and $B_2$ open. Also, when the contacts $C_3$ of the main control coil C are opened, the coil D is de-energized so that contacts $D_1$ open. Coil F is energized and contacts $F_1$ and $F_2$ (normally closed) open and contacts $F_3$ (normally open) become closed. Accordingly, all mechanism is again returned to the respective initial positions, ready to operate upon the next incoming unit of work. As the contacts $F_1$ (normally closed) open, de-energizing solenoid 346 of air valve 348, air ceases to flow to air cylinder 84 so that the escapement finger 86 is retracted downwardly, releasing the next unit of work W to be carried into the machine, while the positioning barrier means 288, 300 are raised so that the completed unit of work W is fed out of the machine.

Although the work units W as described above included extending wire ends 39 of such length that they were cut off to the desired length prior to forming of the eyes 87, it will be understood that the machine can be operated with units of work which have wire ends of such length that a satisfactory loop can be made without severing.

From the foregoing it will be seen that the machine described herein as an illustrative embodiment of the present invention provides advantages in forming an eye at either end of a wire binder on wirebound box components; however, it should be emphasized that the particular embodiment of the invention which is shown and described herein is intended as merely illustrative of the principles of the present invention rather than as exhaustive thereof or as restrictive of the coverage of this patent, which is limited only by the appended claims.

What is claimed is:

1. A machine for forming an eye at either end of an intermediately positioned wire binder or wirebound box components comprising means for supporting a box component with an intermediately positioned wire secured thereto and having portions of the wire extending beyond the edges of said box component, guide means for engaging said extending portions of the wire and moving them transversely if necessary into pre-determined transverse positions, and means for bending the ends of said positioned wire portions into substantially closed eyes.

2. A machine for forming an eye at either end of an intermediately positioned wire binder on wirebound box components comprising means for supporting a box component with an intermediately positioned wire secured thereto and having portions of the wire extending beyond the edges of said box components, lower guide means below the extending wire portions and upper guide means in opposed relationship to the lower guide means, said guide means including converging concave guide surfaces arranged upon convergence to engage the extending wire portions and move the same transversely if necessary into pre-determined transverse positions, drve means for moving said respective guide means into engagement with the extending wire portions for positioning them, and means for bending the ends of said positioned wire portions into substantially closed eyes.

3. A machine for forming an eye at either end of an intermediately positioned binding wire on wirebound box components comprising means for locating a box component with an intermediately positioned binding wire secured thereto and having a portion of the wire extending beyond the edge of said box component, movable support means, control means for moving the support means adjacent to the located box component and for moving the support means away therefrom, guide means on said support means for positioning the extending wire portion, eye-forming mechanism on said support means for bending the extending wire portion around adjacent to itself for providing a rounded end on said wire portion, said guide means and said eye-forming mechanism engaging the extending wire portion when the support means is moved adjacent to the located box component, and drive means for operating said eye-forming mechanism.

4. A machine for forming an eye at the end of an intermediately positioned binding wire on wirebound box components comprising means for conveying a box component into the machine, locating means movable into engagement with the box component for positioning the box component with the intermediately positioned binding wire secured thereto and having a portion of the wire extending beyond the edge of said box component, first drive means for actuating said locating means, movable support means, second drive means for moving the support means adjacent to the located box component and for moving the support means away therefrom, guide means on said support means for positioning the extending wire portion, eye-forming mechanism on said support means for bending the extending wire portion around adjacent to itself for providing a rounded end on said wire portion, said guide means and said eye-forming mechanism engaging the extending wire portion when the support means is moved adjacent to the located box component, third drive means for operating said eye-forming mechanism, sensing means responsive to the completion of the eye-forming operation, and control means for said first and second drive means, said control means being responsive to said sensing means for operating said second drive means to move the support means away from the located box component and for operating said first drive means for disengaging the locating means from said box component for conveying the box component out of the machine.

5. A machine for forming an eye at the end of an intermediately positioned binding wire on wirebound box components as claimed in claim 4 and including second movable support means on the opposite side of the located box component from the first movable support means, fourth drive means for moving the second movable support means adjacent to the located box component, second guide means on the second movable support means for cooperating with the first guide means in positioning the extending wire portion, and second control means responsive to the operation of said fourth drive means for initiating operation of said third drive means for operating said eye-forming mechanism.

6. A machine for forming an eye at either end of an intermediately positioned binding wire on wirebound box components comprising means for locating a box component with an intermediately positioned binding wire secured thereto and having portions of the wire extending beyond the edges of said box component, a work table, elevator drive means for raising the work table adjacent to the located box component and for lowering the work table away therefrom, a plurality of lower guides on said work table for engaging and positioning the extending wire portions, a plurality of rotatable eye-forming mechanisms on said work table, said lower guides and said eye-forming mechanisms engaging the extending wire portions when the table is raised, eye-forming drive means on said work table for operating said eye-forming mechanism, movable support means above the located box component, operating means for lowering said movable support means adjacent to the located box component, and a plurality of upper guides on said movable support means in opposed relationship to said lower guides for engaging the extending wire portions upon lowering of said movable support means, and control means for actuating said eye-forming drive means when the extending wire portions are engaged by said upper and lower guide means.

7. A machine as claimed in claim 6 wherein said lower guides have a V-shaped configuration with a central wire-positioning recess at the apex of said V-shape aligned with said rotatable eye-forming mechanism and said upper guides have an inverted V-shaped configuration, said guides engaging the extending wire portions at a region between the edge of the box component and the rotatable eye-forming mechanism.

8. A machine as claimed in claim 6 and wherein one of said eye-forming mechanisms is adjustably mounted on said table for adjusting the distance between said rotatable eye-forming mechanisms, and said eye-forming drive means on said table includes a rotatable drive member, a plurality of connecting rods each pivotally connected at one end to said drive member in eccentric relationship therewith and each having its other end pivotally connected to respective rotatable eye-forming mechanisms in eccentric relationship therewith, the connecting rod extending to said adjustably mounted eye-forming mechanism being adjustable in length, and control means responsive to the motion of said rotatable drive member for controlling said elevator drive means and for controlling said movable support means.

9. A machine for bending an eye at the end of a wire binder secured to a box component with an end portion of the wire projecting beyond the edge of the box component comprising means for positioning the box component, a movable work table, operating mechanism for moving the work table adjacent to the positioned box component, eye-forming drive means, a rotatable member on said work table and being driven by said drive means, a first wire-bending pin on said rotatable member and being eccentrically located with respect to the axis of rotation of said rotatable member, a second pin for providing an anvil about which the wire loop is bent by said first pin, mounting means for mounting said second pin on said work table with said second pin being offset slightly from said axis on the opposite side of said axis from the initial position of said first pin, said first pin having a surface sloping toward said second pin defining a converging space between said pins, said first pin having an undercut region adjacent to the second pin for holding the wire portion being bent, movable guide means having a converging surface, guide-operating mechanism for moving said guide means to position the wire portion in the converging space between said pins, and control means responsive to operation of said guide-operating mechanism for actuating said eye-forming drive means.

10. A machine as claimed in claim 9 wherein said moving guide means is on the opposite side of the positioned box component from said work table, and work-holding means resiliently mounted on said moving guide means for holding the box component in position.

References Cited by the Examiner
UNITED STATES PATENTS

| | | | |
|---|---|---|---|
| 1,933,031 | 10/1933 | Rosenmund | 140—93 |
| 2,762,432 | 9/1956 | Hogan et al. | 140—93 |
| 3,010,492 | 11/1961 | Ryder et al. | 140—104 |
| 3,039,498 | 6/1962 | Bechtell | 140—102 |
| 3,157,220 | 11/1964 | Svoboda | 140—104 |

CHARLES W. LANHAM, *Primary Examiner.*